United States Patent
Barmichev et al.

(10) Patent No.: US 8,876,999 B2
(45) Date of Patent: Nov. 4, 2014

(54) FLEXIBLE SHAPE LOW VOLUME AUTOCLAVE

(75) Inventors: Sergey D. Barmichev, Bothell, WA (US); Max U. Kismarton, Renton, WA (US); Stephen T. Brown, Everett, WA (US)

(73) Assignee: The Boeing Company, Chicago, IL (US)

(*) Notice: Subject to any disclaimer, the term of this patent is extended or adjusted under 35 U.S.C. 154(b) by 1634 days.

(21) Appl. No.: 11/761,744

(22) Filed: Jun. 12, 2007

(65) Prior Publication Data

US 2008/0308224 A1    Dec. 18, 2008

(51) Int. Cl.
| B32B 37/10 | (2006.01) |
| B29C 70/44 | (2006.01) |
| B29C 35/02 | (2006.01) |
| B29L 31/30 | (2006.01) |

(52) U.S. Cl.
CPC ......... *B29C 70/44* (2013.01); *B29L 2031/3085* (2013.01); *Y02T 50/433* (2013.01); *B29C 35/0227* (2013.01); *B29L 2031/3076* (2013.01); *Y02T 50/43* (2013.01)
USPC ..... 156/285; 156/381; 425/450.1; 425/451.9; 425/519; 264/544; 264/552; 264/347

(58) Field of Classification Search
CPC .............. B01J 3/04; B01J 3/042; F16J 12/00; F16J 13/10; B29C 35/0227
USPC .......... 156/381, 382, 499, 285, 286; 425/182, 425/185, 188, 450.1, 451.9, 47, 54, 519; 264/510, 544, 552, 347
See application file for complete search history.

(56) References Cited

U.S. PATENT DOCUMENTS

| 2,411,497 | A | | 11/1946 | Barnes | |
| 3,623,303 | A | * | 11/1971 | Aigner | ............................... 56/44 |
| 4,997,511 | A | | 3/1991 | Newsom | |
| 5,424,046 | A | * | 6/1995 | Smith et al. | .................... 422/295 |
| 5,758,909 | A | * | 6/1998 | Dole et al. | ..................... 285/305 |
| 6,001,305 | A | * | 12/1999 | Mueller | ........................... 422/26 |
| 6,257,858 | B1 | | 7/2001 | Pabsch et al. | |

(Continued)

FOREIGN PATENT DOCUMENTS

| DE | 19529508 C1 | 10/1996 |
| EP | 0333389 A1 | 9/1989 |

(Continued)

OTHER PUBLICATIONS

Derwent Abstract for SU 134229A1.*

(Continued)

*Primary Examiner* — Christopher Schatz
(74) *Attorney, Agent, or Firm* — Toler Law Group, PC

(57) ABSTRACT

Techniques and apparatus for providing a flexible shape low volume autoclave are disclosed. In one embodiment, an autoclave includes an elongated pressure vessel that is sealed on both ends and has a circumferential joint between a first portion and a second portion. The autoclave further includes the portions defining an interior configured for accepting an elongated part, the joint being configured to create an angle between the portions and further creating an opening with a seal, the opening facilitating an insertion of the part into the interior, and the seal enabling pressurization of the interior.

20 Claims, 9 Drawing Sheets

(56) References Cited

U.S. PATENT DOCUMENTS

| | | | |
|---|---|---|---|
| 6,692,681 B1 * | 2/2004 | Lunde | 264/510 |
| 6,872,918 B2 * | 3/2005 | Toll | 219/400 |
| 2007/0080481 A1 | 4/2007 | Kismarton | |
| 2008/0308224 A1 | 12/2008 | Barmichev et al. | |
| 2012/0073745 A1 | 3/2012 | Barmichev et al. | |

FOREIGN PATENT DOCUMENTS

| | | | | |
|---|---|---|---|---|
| JP | 04135810 | A | * | 5/1992 |
| SU | 1346229 | A1 | * | 10/1987 |
| UA | 12390 | U | | 2/2006 |
| WO | WO2007043876 | A1 | | 4/2007 |
| WO | 2008154602 | A1 | | 12/2008 |

OTHER PUBLICATIONS

Abstract for JP04135810A.*
Derwent Abstract for JP04135810A.*
Translation of JP 04135810.*
Translation of SU 19871023.*
Machine translation of DE 19529508.*
Campbell, "Manufacturing Processes for Advanced Composites", 2004, Elsevier Advanced Technology, Oxford, pp. 176-177; figure 2.
PCT Intl Search Report and Written Opinion for Application No. PCT/US2008/066604, dated Oct. 6, 2008, 15 pgs.
European Search Report for Application No. 12155488, dated Jun. 21, 2012, 5 pages.
European Search Report for Application No. 12155488, dated Nov. 23, 2012, 9 pages.

* cited by examiner

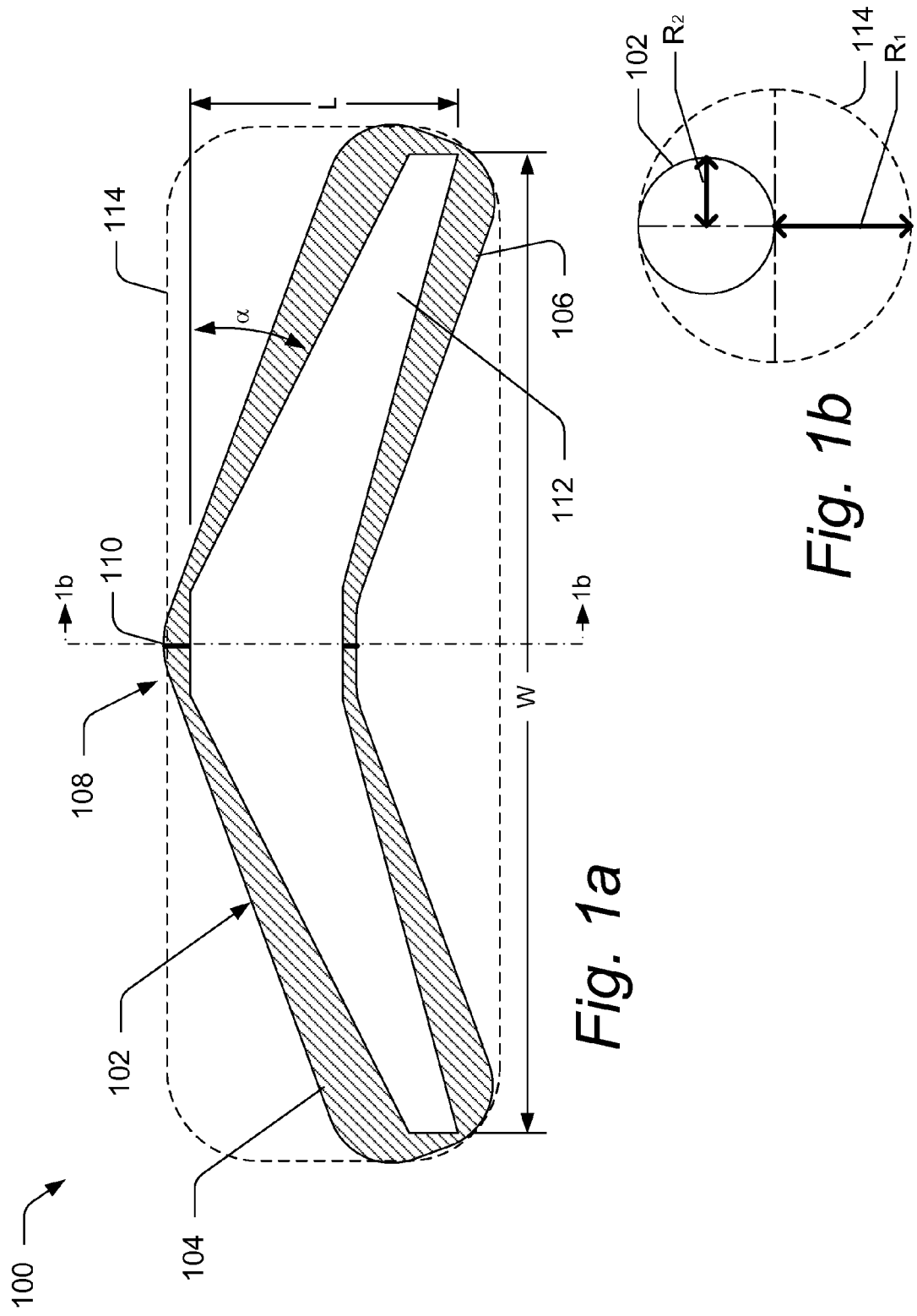

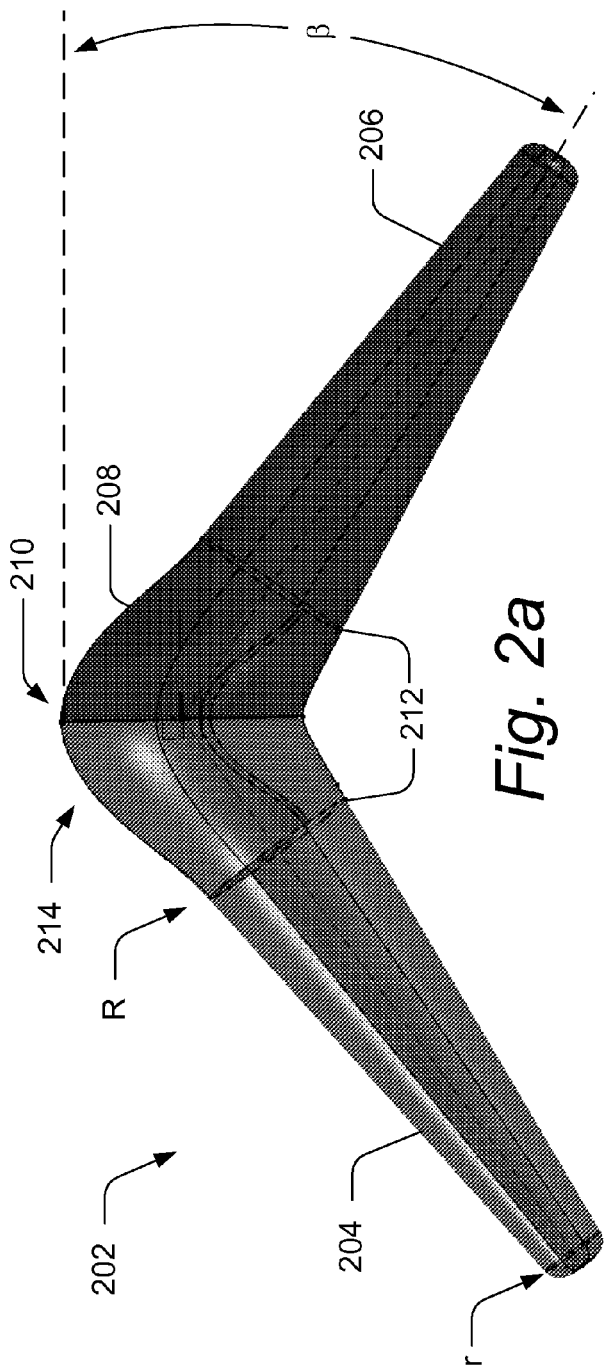
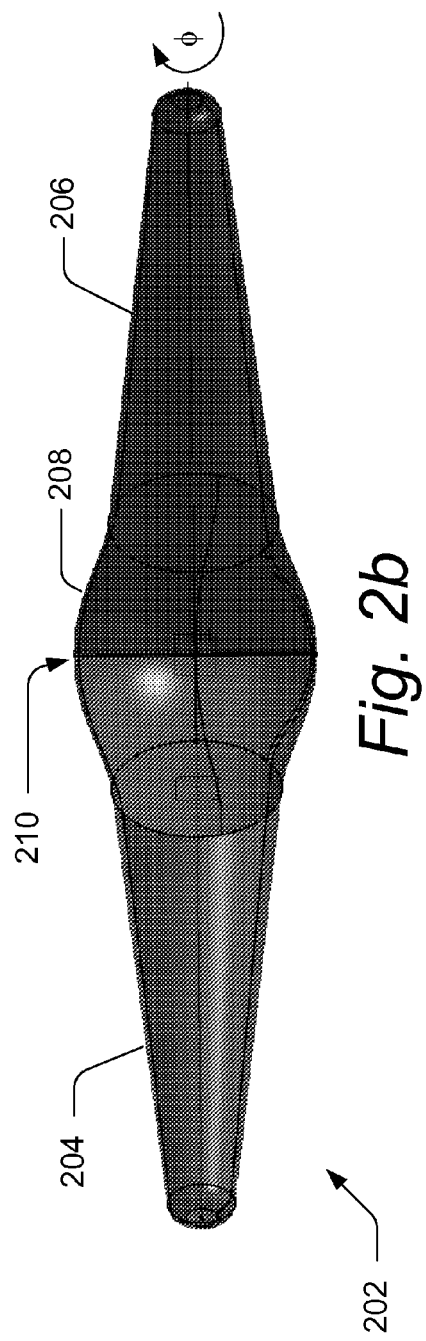
Fig. 2a
Fig. 2b

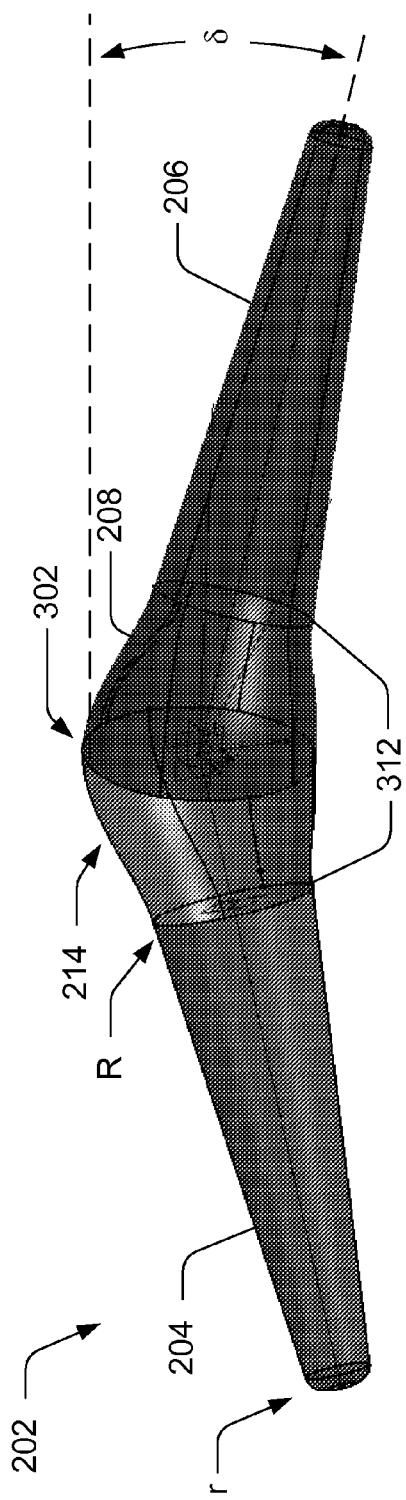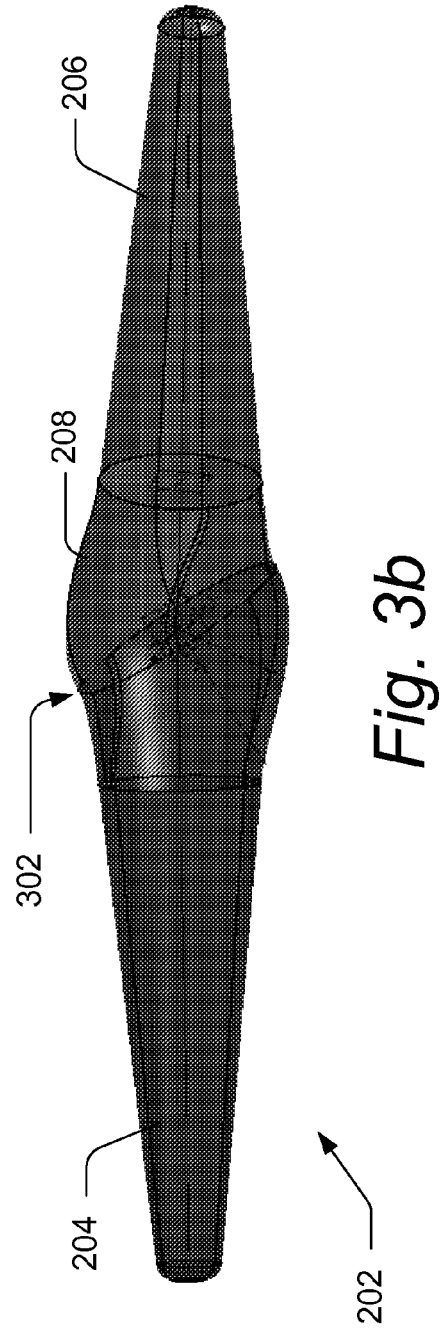
Fig. 3a
Fig. 3b

FLEXIBLE SHAPE LOW VOLUME AUTOCLAVE

TECHNICAL FIELD

The present disclosure relates to autoclaves, and more specifically, to apparatus and techniques for using a flexible shape low volume autoclave to cure composite parts.

BACKGROUND

Autoclaves are devices that apply pressure and heat to an object in a controlled environment. Autoclaves are typically steel tanks layered with insulation and having a generally cylindrical shape. Additionally, autoclaves include heat exchangers, fans, pressure hoses, vacuums, and other apparatus to assist in applying pressure and heat to the object. In one application, autoclaves may be used to cure fiber-reinforced composite materials which are placed into the autoclave on a mold tool.

As the size of an autoclave increases, particularly the diameter, the cost of the autoclave increases. A relatively large autoclave with an internal cavity measuring approximately 9 meters (30 feet) in diameter by 24 meters (80 feet) in length may cost tens of millions of US dollars to manufacture. As the diameter increases, the cost of the autoclave may exponentially increase, thus creating a practical limitation on the manufactured size of autoclaves. In addition, each operation cycle of the autoclave includes an associated cost relative to the size of the autoclave. During a cycle, the autoclave may require energy to heat up to approximately 260° C. (500° F.) and pressurize to approximately 690 kPa (100 psi). In addition, cooling agents, such as nitrogen may be used to reduce the cycle time for the autoclave, further increasing the cost per cycle. A cycle for the autoclave mentioned above may cost tens of thousands of US dollars.

The use of new materials to create large objects has presented a unique challenge for autoclave applications. The introduction of fiber-reinforced composite materials has enabled the creation of large single piece objects. These large parts are often advantageous because they do not require fasteners, joints, and other joining devices, and thus have a reduced weight compared to their assembled counterparts. Particularly, in aircraft manufacturing, large single piece objects may be desirable for the above mentioned reasons. Accordingly, there is a continuing need to improve autoclaves to reduce manufacture and cycle costs, and to enable autoclaves to create large objects.

SUMMARY

Techniques and apparatus for providing a flexible shape low volume autoclave are disclosed. In one embodiment, an autoclave includes an elongated pressure vessel that is sealed on both ends and has a circumferential joint between a first portion and a second portion. The autoclave further includes the portions defining an interior configured for accepting an elongated part, the joint being configured to create an angle between the portions and further creating an opening with a seal, the opening facilitating an insertion of the part into the interior, and the seal enabling pressurization of the interior.

In another embodiment, a low volume autoclave includes a pressure vessel having a joint between a first portion and a second portion, the first portion and the second portion each defining a portion of an internal cavity for accepting a part, the joint creating an angle between longitudinal axes of the first portion and the second portion, the joint having a seal to facilitate increased pressure and heat within the pressure vessel in a closed position. In addition, the autoclave may include a transport system for movably opening and closing the pressure vessel by separating the first portion from the second portion at the joint, the transport system configured to insert and remove the part from the cavity.

In a further embodiment, a method of manufacturing aircraft parts using an autoclave includes inserting a part through a first mating surface of a first portion of an autoclave, the part entering into a first cavity within the first portion. The method further includes traversing a second portion of the autoclave toward the part, the part projecting through a second mating surface and entering a second cavity within the second portion, joining the first mating surface and the second mating surface to seal the part within the autoclave, and applying pressure and heat to the part.

The features, functions, and advantages can be achieved independently in various embodiments of the present disclosure or may be combined in yet other embodiments.

BRIEF DESCRIPTION OF THE DRAWINGS

Apparatus and techniques in accordance with the present disclosure are described in detail below with reference to the following drawings.

FIG. 1a is a partial cross sectional view of an object inside a flexible shape low volume autoclave in accordance with an embodiment of the disclosure;

FIG. 1b is a partial cross sectional view of the flexible shape low volume autoclave in comparison to the cross sectional view of an existing autoclave;

FIGS. 2a and 2b are isometric and elevational views of a flexible shape low volume autoclave in accordance with another embodiment of the disclosure, specifically, FIG. 2a is a top view of an autoclave configured for curing an aircraft wing with a large sweep angle and FIG. 2b is a front view of the autoclave in FIG. 2a;

FIGS. 3a and 3b are isometric and elevational views of the flexible shape low volume autoclave 202 in a second position, specifically, FIG. 3a is a top view of an autoclave configured for curing an aircraft wing with a small sweep angle and FIG. 3b is a side view of the autoclave in FIG. 3a;

DETAILED DESCRIPTION

Figure 4:
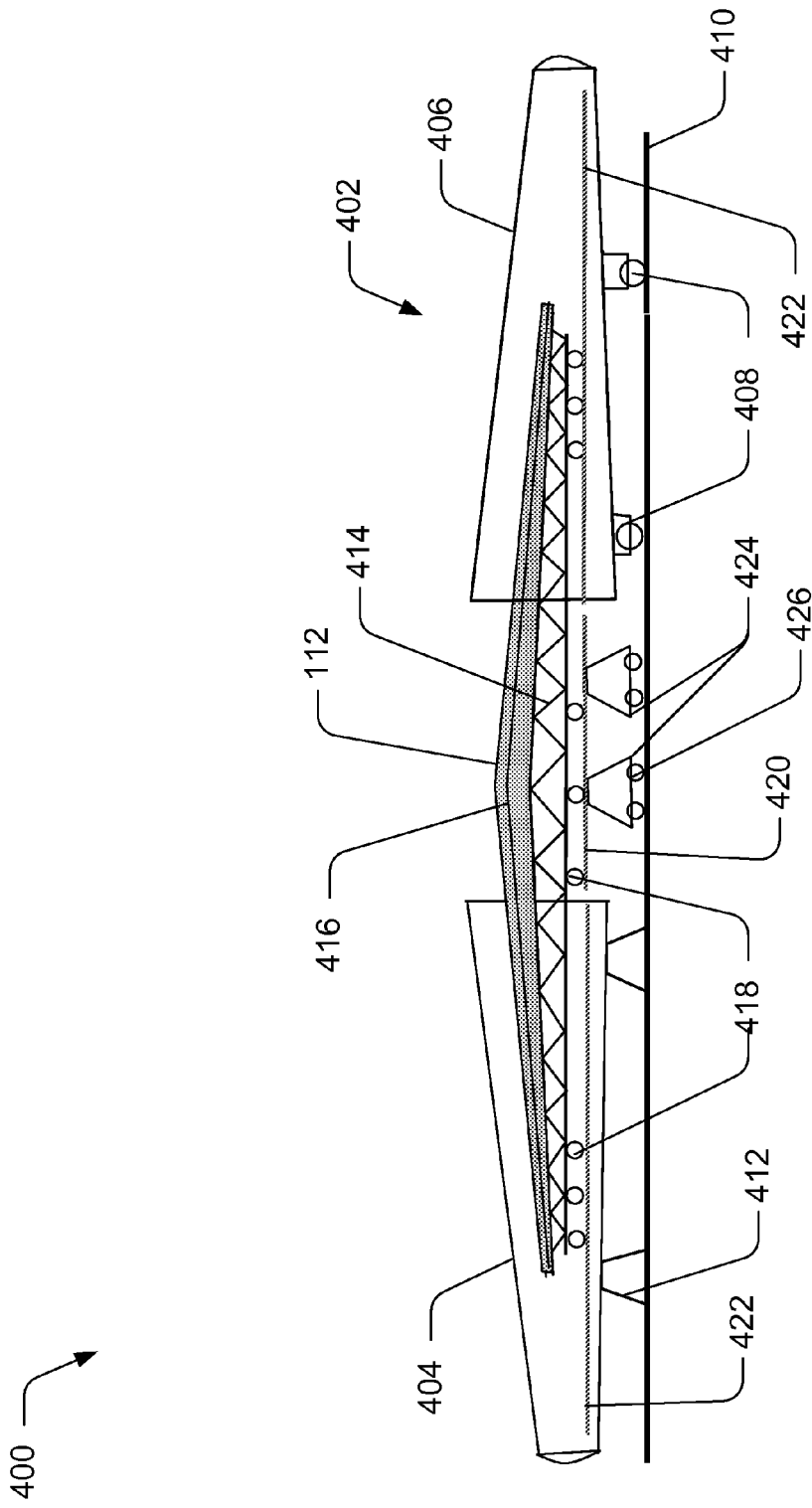
FIG. 4 is a side elevation view of a flexible shape low volume autoclave, including carts, tools and tracks for positioning a part within the autoclave, in accordance with an embodiment of the disclosure.

Apparatus and techniques for providing a flexible shape low volume autoclave are described herein. Many specific details of certain embodiments of the disclosure are set forth in the following description and in FIGS. 1 through 10 to provide a thorough understanding of such embodiments. One skilled in the art, however, will understand that the present disclosure may have additional embodiments, or that the present disclosure may be practiced without several of the details described in the following description. In the present discussion, it is understood that the term "fiber-reinforced composite material" or "reinforced composite material" includes various non-homogeneous polymer-based and non-polymeric based materials, commonly referred to as "reinforced composites", "carbon-fiber composites", or still other terms known in the art.

FIG. 1a is a partial cross sectional view of an object inside a flexible shape low volume autoclave in accordance with an embodiment of the disclosure. In environment 100, a flexible shape low volume autoclave 102 includes a first portion 104 offset from an angled second portion 106. A joining portion 108 may be included between the first portion 104 and the second portion 106. Further, the joining portion 108 may include a joint 110 that allows the flexible shape low volume autoclave 102 to open, thus exposing the interior of the autoclave 102.

The environment 100 also includes a part 112 that may be relatively large (e.g., an aircraft wing). In some embodiments, the part 112 may include complex geometries. For example, the part 112 may be a single piece aircraft wing with a sweep and/or dihedral angle α. The part 112 may have a width W and a length L. For example, an aircraft wing may have the width W of approximately 200 feet and the length L of approximately 80 feet. In some aspects, the part 112 may be formed of a fiber-reinforced composite material that requires a curing process performed within the autoclave 102. Therefore, the part 112 may be placed inside of the flexible shape low volume autoclave 102.

An existing (or prior art) autoclave 114 (represented by dashed lines) formed in a substantially cylindrical shape is represented around the flexible shape low volume autoclave 102 for comparison purposes. It will be appreciated that the volume of the prior art autoclave 114 is much greater than the volume of the flexible shape low volume autoclave 102.

FIG. 1b is a partial cross sectional view of the flexible shape low volume autoclave 102 in comparison to the cross sectional view of the existing autoclave 114. The existing autoclave 114 has a radius $R_1$ while the flexible shape low volume autoclave 102 has a radius $R_2$. As shown in FIG. 1b, the cross-sectional area of the flexible shape low volume autoclave 102 is significantly less than the cross-sectional area of the existing autoclave 114 by a degree of squares, as derived from Equation 1 below. For example, in a particular embodiment, if the existing autoclave has a diameter of 80 feet ($R_1 \approx 40$ ft) to accommodate the part 112, the flexible shape low volume autoclave 102 may have a diameter of about 40 feet ($R_2 \approx 20$ ft) because the angled second portion 106 in connection to the first portion 104 permits a reduced volume to enclose the part 112. As deduced from Equation 1, both the surface area and volume of the flexible shape low volume autoclave 102 is about a fourth of the surface area and volume, respectively, of the existing autoclave 114.

$$Vol = \pi \cdot R^2 \cdot h \qquad \text{Eq. 1}$$

As the sweep and/or dihedral angle α of the non-linear part 112 increases, the radius $R_1$ of an existing autoclave 114 increases with respect to the radius $R_2$. In turn, the volume derived from $R_1$ increases in proportion to the radius (or diameter) squared. Therefore, the flexible shape low volume autoclave 102 creates a substantially greater savings in internal volume (minimizes excess/unused internal volume) as compared to the existing autoclave 114 which would be necessary to contain the part 112.

As discussed above, the existing autoclave 114 with an internal volume large enough to contain the part 112 may be very expensive to build, if not prohibitively difficult due to structural constraints and large amounts of materials that may be required to erect the autoclave. Further, the volume of an autoclave relates to the per cycle cost to operate the autoclave for curing the part 112 or other operations. Thus, it is advantageous to reduce the volume of the autoclave from at least a capital investment and a per cycle operation cost perspective.

In an exemplary process, the flexible shape low volume autoclave 102 is opened at the joint 110 between the first portion 104 and the second portion 106. The first and second portions 104, 106 are separated to expose an interior configured for accepting an elongated part. The joint 110 may be configured to create the angle α between the portions and further create an opening with a seal. In some instances, the joining portion 108 may be replaced or reconfigured to create a different angle α between the first and second portions 104, 106. The opening may facilitate an insertion of the part 112 into the interior. The part 112 may be loaded into at least the first portion 104. The flexible shape low volume autoclave 102 may then be closed by moving the first and second portions toward each other into a mating position where the seal may enable pressurization of the interior. In some instances, the closing process may include inserting the part 112 into the second portion 106.

FIGS. 2a and 2b are isometric views of a flexible shape low volume autoclave in accordance with another embodiment of the disclosure. FIG. 2a is a top view of an autoclave configured for curing an aircraft wing with a sweep angle β, and FIG. 2b is a front view of the autoclave in FIG. 2a. FIG. 2a illustrates an approximately conical (or bi-conical) autoclave 202 having a flexible shape and low volume. The conical autoclave 202 includes a first conical portion 204 and a second conical portion 206. A joining portion 208 is situated between the first and second conical portion 204, 206. The joining portion may further include a joint 210 that allows the conical autoclave 202 to open, thus exposing the interior of the autoclave.

The volume of the conical autoclave 202 can be approximately determined by Equation 2 for a frustum, or partial cone, having a large radius R and a smaller radius r. For some parts, such as the part 112, a frustum volume may completely enclose the part and reduce excess volume, while maintaining enough internal volume around the part to properly cure it during a curing process. For example, a specified airflow is typically desired around the part 112 situated within the conical autoclave to maintain consistent temperatures across the part during the curing process. Both intuitively, and through example calculations comparing Equation 1 and Equation 2, when r<R, the volume of the frustum portions shown in FIGS. 2a and 2b are less than the volume of a cylinder, as used in the previously-described autoclave 102 (FIGS. 1a and 1b). Therefore, the conical autoclave 202 may have a smaller volume than the cylindrical flexible shape low volume autoclave 102.

$$Vol = \frac{1}{3}\pi \cdot h \cdot (R^2 + Rr + r^2) \qquad \text{Eq. 2}$$

In further aspects, other geometries that reduce the internal volume of the autoclave may be employed while permitting the part 112 to be contained within the autoclave and maintaining proper operational tolerances necessary for proper operation of the autoclave, such as without limitation spacing to accommodate airflow, tooling, and other apparatus. For example, an autoclave may be formed from a generally "S" shaped tube with a substantially circular cross section. The S-shaped autoclave may be tailored to curing complementary shaped parts that are too large to fit into (or otherwise unsuitable for) standard sized autoclaves, such as complementary shaped parts that measure greater than 100 feet in length. In further aspects, the disclosed autoclave does not require symmetry between the first portion 104 and the second portion 106. Further, additional portions may be included, and each portion may be separated by a joining portion including a joint.

Returning to FIG. 2a, the conical autoclave 202 further includes attachment surfaces 212 between the joining portion 208 and the first and second conical portion 204, 206. The attachment surfaces 212 may allow different joint portions 208 to be used, thus allowing the conical autoclave 202 to be configured for parts with different geometries (e.g. linear or non-linear), such as aircraft wings with different sweep angles α. In other embodiments, the joining portion 208 may be formed in a partially spherical shape 214 that includes a mating surface at the joint 210. The partially spherical shape may facilitate providing a circular cross-section along the joint 210 as further explained below. Thus, the partially spherical shape 214 may facilitate a rotation of an angle φ of the first conical portion 204 or second conical portion 206 about the joint 210 in order to change the angle α of the conical autoclave 202. In an exemplary configuration, Table 1 includes exemplary data for the angle φ created by rotating the first conical portion 204 relative the second conical portion 206, creating the angle α for the conical autoclave 202.

TABLE 1

| Rotation Angle φ Relative to Conical Portions | Resulting Sweep + Dihedral Angle α |
|---|---|
| 0° | 35° |
| 45° | 32° |
| 135° | 12.5° |
| 180° | 0° |

FIGS. 3a and 3b are isometric and elevational views of the flexible shape low volume autoclave 202 in a second position. More specifically, FIG. 3a is a top view of the conical autoclave 202 configured for curing an aircraft wing with a relatively small sweep angle δ, and FIG. 3b is a side elevational view of the conical autoclave 202 in FIG. 3a. Comparison of FIG. 3a with FIG. 2a shows that the angle δ is substantially less than the angle β. In some embodiments, the angle δ may be achieved by replacing the joining portion 208 with another joint portion that creates the angle δ. In other embodiments, the joining portion 208 may include the joint 210 which may facilitate rotation to change the sweep angle from the angle β shown in FIG. 2a to the angle δ shown in FIG. 3a.

In other embodiments, the autoclave may in a toroidal configuration (i.e., a curved tube). In a toroidal configuration, the large part (e.g., aircraft wing) may be rotated into the toroidal autoclave. In still further embodiments, some or all aspects of the cylindrical, conical, and toroidal autoclaves may be combined to create an autoclave capable of curing large parts without excessive internal volume.

FIG. 4 is a side elevation view of a flexible shape low volume autoclave, including carts, tools and tracks for positioning the part 112 within the autoclave, in accordance with an embodiment of the disclosure. An environment 400 includes a conical autoclave 402 with a first conical portion 404 and a second conical portion 406. In some embodiments, either the first conical portion 404 or the second conical portion 406, or both, may be movable by wheels 408 or other motion enabling features. For example, the second conical portion 406 may be movable along a stationary track 410 configured to guide the wheels 408, and thus the second conical portion 406, toward the first conical portion 404. Additionally, either the first conical portion 404 or the second conical portion 406 may be stationary, such as being secured on legs 412. In an exemplary embodiment, the second conical portion 406 may include wheels accepted by a complementary track while the first conical portion 404 may be stationary and supported by the legs 412. In operation, the conical autoclave 402 may be opened to expose the interior and either load or remove the part 112 by first rolling the second conical portion 406 away from the first conical portion 404. Conversely, the autoclave may be closed by reversing the above operation.

In addition, the environment 400 may include a jig 414 to support a tool 416. The tool 416 may be used in the autoclave to support the uncured part 112 during a curing process, such as an uncured aircraft wing formed from fiber-reinforced composite material. The jig may include jig wheels 418 or other motion enabling features. The jig wheels 418 may traverse an elevated track 420 and autoclave tracks 422, or other substantially planar surface, to move the jig 414. The elevated track 420 may be supported by carts 424. Similar to the jig 414, the carts 424 may include cart wheels 426 that may be used to traverse the stationary (or non-stationary) track 410. In some embodiments, more than one stationary track 410 may be used to move the jig 414 and the first conical portion 404. Similarly, more than one elevated track 420 may be used in the environment 400.

Figure 5:
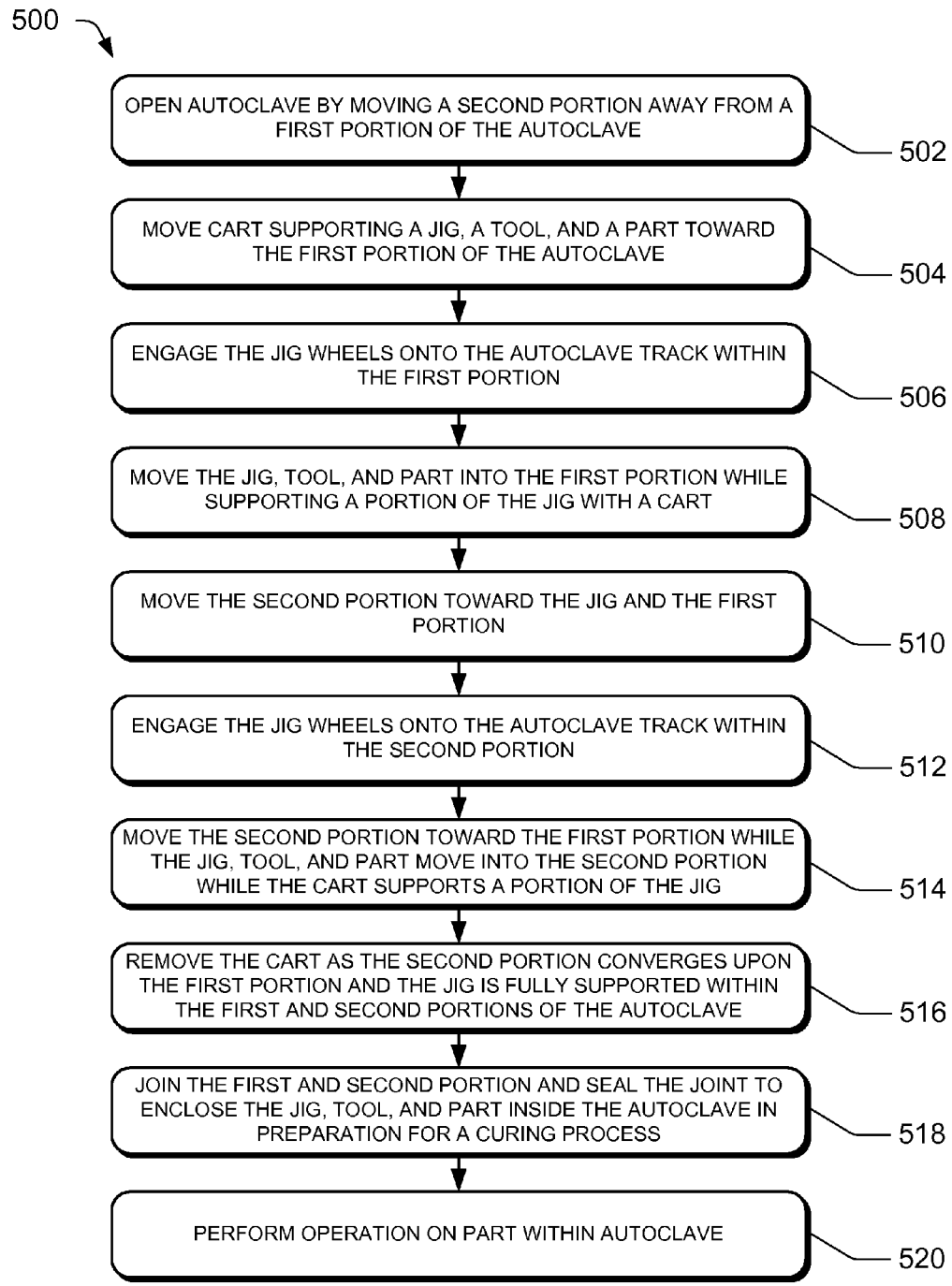
FIG. 5 is a flow chart for an exemplary process of operating a flexible shape low volume autoclave in accordance with another embodiment of the disclosure.

FIG. 5 is a flow chart for an exemplary process 500 of operating a flexible shape low volume autoclave in accordance with another embodiment of the disclosure. For convenience and to better illustrate the exemplary process 500, the components described in the environment 400 of FIG. 4 will be discussed in the exemplary process 500. The exemplary process 500 may begin with the conical autoclave 402 being empty (i.e., no jig 414, tool 416, or part 112 inside the autoclave) and in a closed position.

At block 502, the conical autoclave 402 may be opened. For example, in the particular embodiment shown in FIG. 4, the conical autoclave 402 may be opened by traversing the second conical portion 406, having wheels 408, along the track 410. When the autoclave 402 is opened, at block 504, the jig 414 supporting the tool 416 and the part 112 may be traversed along the track 410 on carts 424. At the block 506, the jig 414 may engage the first conical portion 404, held stationary on legs 412, and the jig wheels may engage the autoclave track 422 in the first conical portion 404. At the block 508, the jig 414, the tool 416, and the part 112 are moved inside the first conical portion 404 along the autoclave track 422. The carts 424 continue to support a portion of the jig 414. The carts 424 may remain stationary during a portion of this operation while the jig 414 traverses into the first conical portion 404.

At the block 510, the second conical portion 406 may then be moved along the stationary tracks 410 toward the jig 414 and the first conical portion 404. At the block 512, the jig 414 may engage the autoclave track 422 in the second conical portion 406. The second conical portion 406 is moved toward the first conical portion 404 at block 514, while the jig 414, the tool 416, and the part 112 move into the second conical portion 406 while the cart 424 supports a portion of the jig 414. As the second conical portion 406 converges upon the first conical portion 404, the carts 424 may be removed at block 516. At block 518, upon mating of the first conical portion 404 and the second conical portion 406, the joint 210 may be securely sealed, as discussed in further detail below. At block 520, an operation may be performed on the part 112 by increasing the temperature and pressure within the conical autoclave 402.

Figure 6:
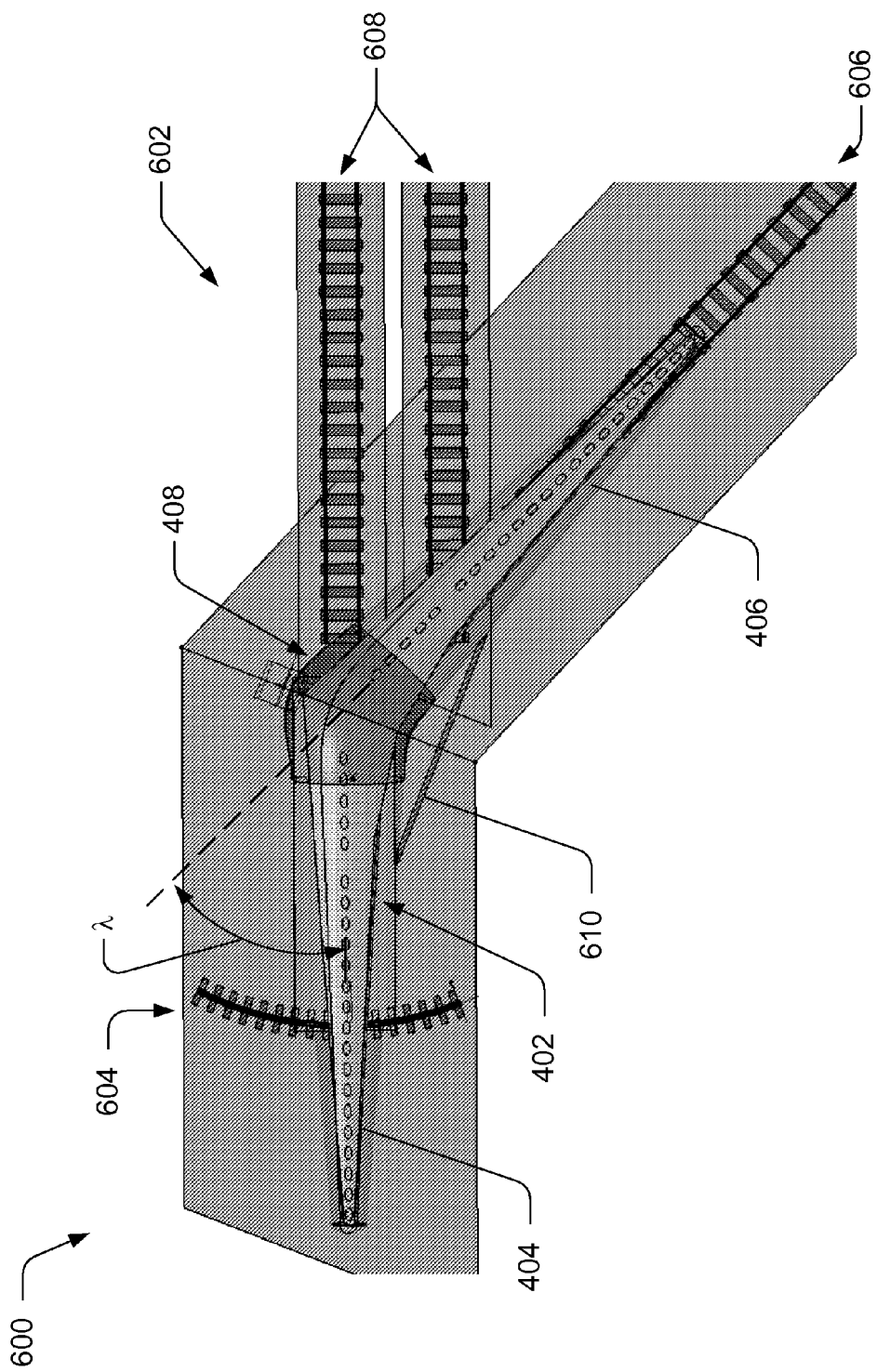
FIG. 6 is a plan view of a flexible shape low volume autoclave and positioning apparatus in accordance with another embodiment of the disclosure.

FIG. 6 is a plan view of a flexible shape low volume autoclave and positioning apparatus in accordance with another embodiment of the disclosure. An environment 600 includes the conical autoclave 402 having the first conical portion 404 and second conical portion 406. The conical autoclave 402 is located on a track system 602. The track system 602 includes a radial track 604, a mating track 606, and a part track 608.

The radial track 604 includes a radius of curvature with a center point under the joining portion 208 of the conical autoclave 402. In some instances, a conical autoclave angle λ may be adjusted to accommodate different part configurations. For example and without limitation, if a first aircraft wing with a relatively shallow sweep angle and/or dihedral is presented, the radial track 604 may facilitate rotating the first conical portion 404 clockwise to a position where the angle λ is smaller. Similarly, the first conical portion 404 may be rotated counterclockwise to increase the angle λ. Further details of changing the conical autoclave angle λ will be provided below.

The mating track 606 provides a transport direction to facilitate moving the second conical portion 406 either toward or away from the first conical portion 404 to close or open, respectively, the conical autoclave 402. The second conical portion may be supported by the cart 424 which interact on the track and travel in a generally linear direction. In some instances, the mating track 606 may intersect the center point of the radial track 604, thus aligning the second conical portion 406 to mate with the first conical portion 404.

The part track 608 may include one or more tracks that are generally parallel to one another and facilitate the loading and unloading of the conical autoclave 402. For example, the cart 424 may support the jig 414 and the tool 416 and move along the part track 608 to load the conical autoclave 402 with an uncured part. After the curing process is complete, the cart 424 may be used to remove the part 112 from the conical autoclave 402.

The conical autoclave 402 may also include a brace 610 to prevent changes in the conical autoclave angle λ, such as when the autoclave is in operation and under high pressure. Additional braces may be used to secure the conical autoclave 402 during part processing, such as during the curing of a part.

Figure 7:
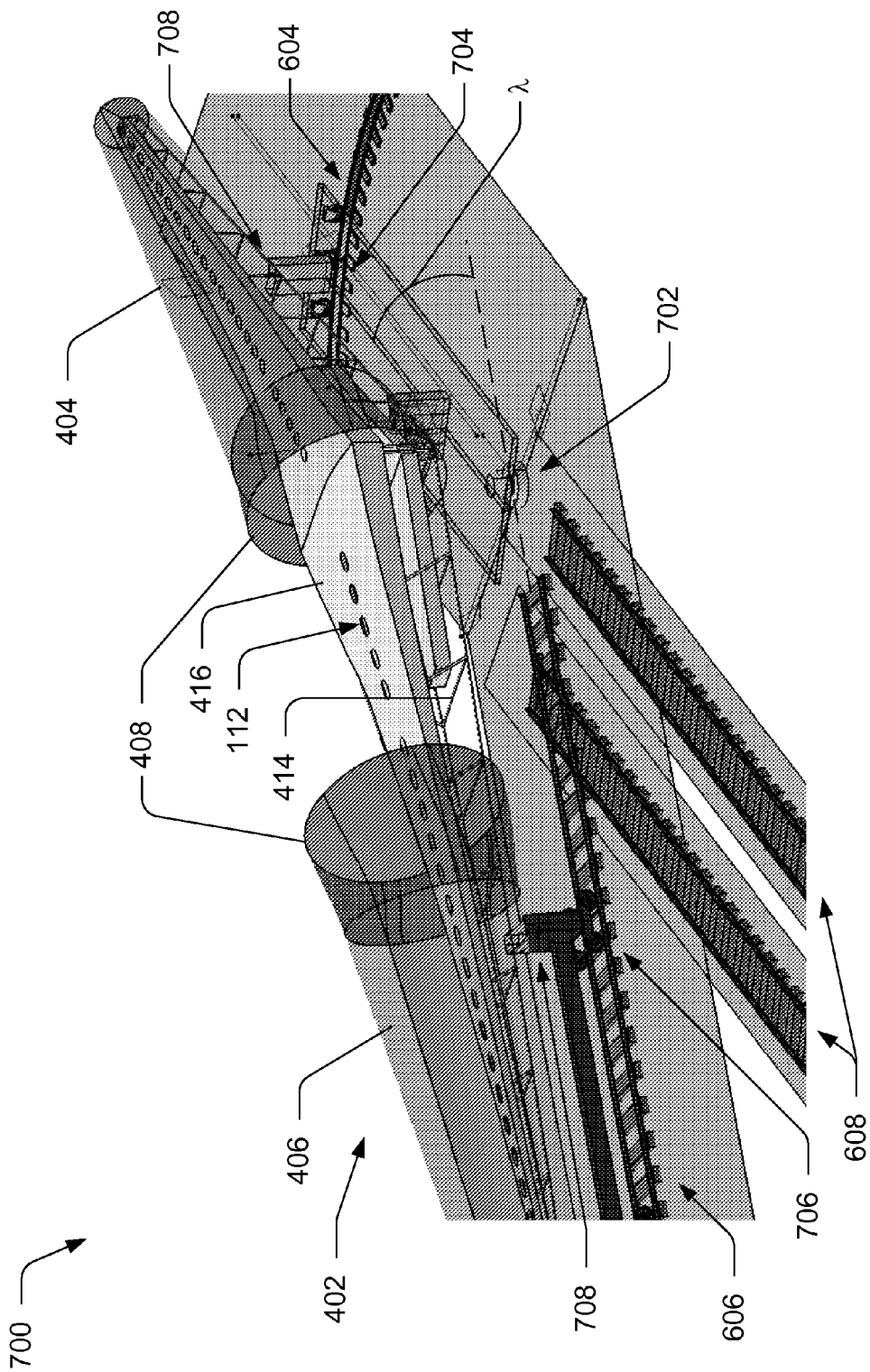
FIG. 7 is an isometric view of a partially opened flexible shape low volume autoclave and positioning apparatus in accordance with another embodiment of the disclosure.

FIG. 7 is an isometric view of a partially opened flexible shape low volume autoclave and positioning apparatus in accordance with another embodiment of the disclosure. An environment 700 includes the conical autoclave 402 in a partially open configuration, a pivot point 702, a radial cart 704, and a mating cart 706.

The pivot point 702 allows the first conical portion 404 to rotate along the radial track 704, thus facilitating a change in the conical autoclave angle λ. The pivot point may support the joint end of the first conical portion 404 while the radial cart 704 may support the opposite end of the first conical portion. The radial cart 706 may include features to facilitate moving along the radial track 704.

The mating cart 706 may be configured for moving the second conical portion 406 along the mating track 706. In addition, both the mating cart 706 and the radial cart 704, and any other surface or support in contact with the conical autoclave 402, may include rollers 708. The rollers 708 may facilitate the rotation of either the first conical portion 404 or the second conical portion 406, or both, to adjust the angle λ formed at the joining portion 208. For example, the conical autoclave 402 may be configured to create the part 112 with the angle λ that may be relatively small. The next part may require a larger value for the angle λ, therefore the first conical portion 404 and the second conical portion 406 may be rotated to the respective orientation to form the desired angle λ at the joining portion 208, thus creating the desired angle λ when the conical autoclave is in the closed position. In some aspects, the angle λ may be adjusted when the conical autoclave 402 is in the closed position.

Figure 8:
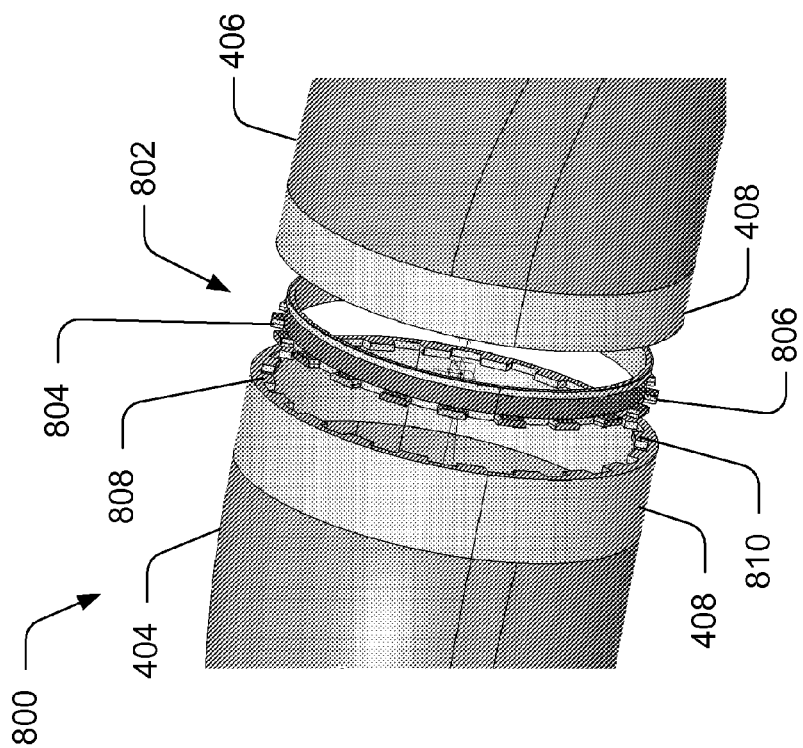
FIG. 8 is an exploded isometric view of an exemplary locking mechanism for a flexible shape low volume autoclave in accordance with another embodiment of the disclosure.

FIG. 8 is an exploded isometric view of an exemplary locking mechanism for a flexible shape low volume autoclave in accordance with another embodiment of the disclosure. More specifically, an environment 800 includes a locking mechanism 802 that securely joins the first conical portion 404 to the second conical portion 406 when the conical autoclave 402 is in the closed configuration. In this embodiment, the locking mechanism 802 includes a first cog 804 with first cog teeth 806 that may engage a second cog 808 with second cog teeth 810. The first and second cog teeth 806, 810 have slots with the same pitch as the teeth, thus allowing the teeth from the first cog 804 to be inserted through the second cog 808.

In operation, the first cog 804 and the second cog 808 may engage each other when the first conical portion 404 and the second conical portion 406 are mated, and with the first cog teeth 806 aligned with the slots formed between the second cog teeth 810. Either the first cog 804 or the second cog 808 may be rotated to align the first cog teeth 806 and the second cog teeth 810, thus tightly securing the conical autoclave 402 in the closed position. For example and without limitation, the first cog may be rotatably connected to the joining portion 208 of the second conical portion 406, and thus rotate into a secure position by either manual or mechanical rotation. In other instances, the rollers 708 may provide the rotation necessary to engage the first cog teeth 806 with the second cog teeth 810 in a secure position. Other features, including locking and tightening features, gaskets, lips, bumps, flanges, or the like may be included in the locking mechanism 802 to create a tight and secure connection between the first and second conical portion 404, 406, thus facilitating the autoclave to maintain high temperatures and high pressures during operation.

Figure 9:
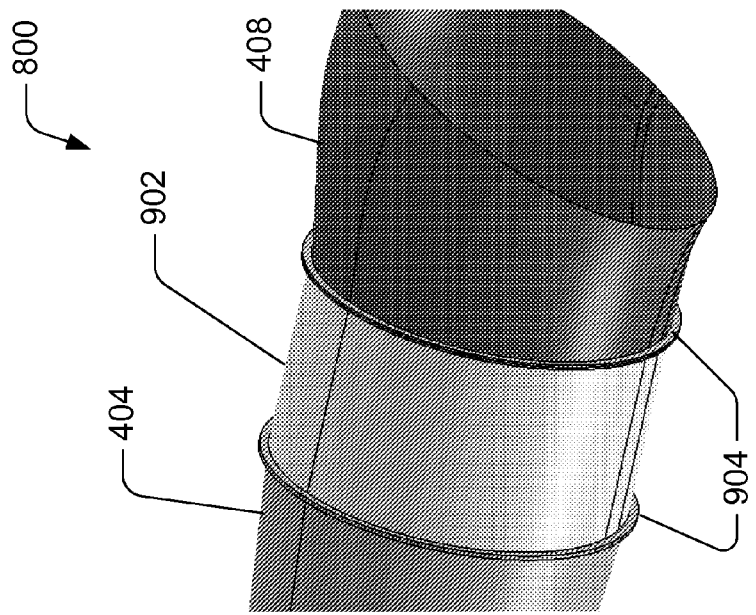
FIG. 9 is an isometric view of an exemplary cylindrical insert for a flexible shape low volume autoclave in accordance with another embodiment of the disclosure.

FIG. 9 is an isometric view of an exemplary cylindrical insert for a flexible shape low volume autoclave in accordance with another embodiment of the disclosure. More specifically, in this embodiment, an environment 900 includes an insert 902 that is configured to be used to extend the length of the autoclave or otherwise modify the internal cavity of the conical autoclave 402. For example, the part 112 may be cured within the conical autoclave 402 when the insert 902 is attached to flanges 904 between the first conical portion 404 (or any other conical portion) and the joining portion 208.

Figure 10:
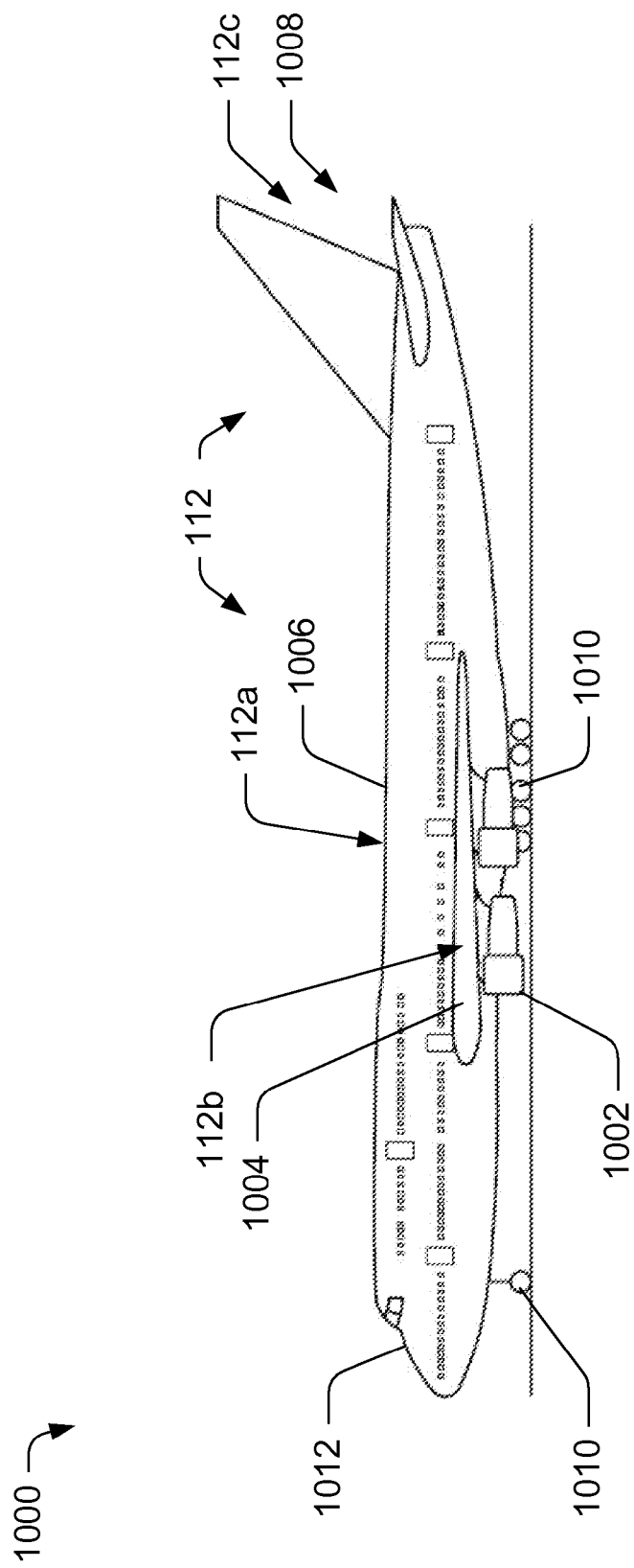
FIG. 10 is a side elevation view of an aircraft having one or more of the disclosed embodiments of the present disclosure.

Those skilled in the art will also readily recognize that the foregoing embodiments of the conical autoclave 402 may be used to create parts 112 for a wide variety of different structures, assemblies, and systems. Referring now in particular to FIG. 10, a side elevation view of an aircraft 1000 having one or more parts 112 that may be processed using the conical autoclave 402 of the disclosed embodiments of the present disclosure is shown. The aircraft 1000 generally includes a variety of components and subsystems known in the pertinent art, which in the interest of brevity, will not be described in detail. For example, the aircraft 1000 generally includes one or more propulsion units 1002 that are coupled to wing assemblies 1004, or alternately, to a fuselage 1006 or even other portions of the aircraft 1000. Additionally, the aircraft 1000 also includes an empennage 1008 and a landing assembly 1010 coupled to the fuselage 1006, and a flight control system 1012 (not shown in FIG. 10), as well as a plurality of other electrical, mechanical and electromechanical systems that cooperatively perform a variety of tasks necessary for the operation of the aircraft 1000.

With reference still to FIG. 10, the aircraft 1000 may include one or more parts processed using the conical autoclave 402 according to the present disclosure, which may be incorporated into various structural portions of the aircraft 1000. For example, the various disclosed embodiments may be used to form entire parts 112, or large portions thereof, such as the fuselage 1006 (112*a*), the wings 1004 (112*b*), and/or portions in the empennage 1008 (112*c*).

The aircraft 1000 is generally representative of a commercial passenger aircraft, which may include, for example, the 737, 747, 757, 767, 777 and 787 commercial passenger aircraft available from The Boeing Company of Chicago, Ill. In alternate embodiments, the parts processed by the apparatus described in the present disclosure may also be incorporated into flight vehicles of other types, or other moveable platforms. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK. In addition, moveable vehicles may include maritime vessels, automobiles, and other moveable platforms for transit on land or in water.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method to manufacture an aircraft wing having a non-zero dihedral angle using an autoclave, the method comprising:
   inserting a first portion of the aircraft wing into a first portion of the autoclave;
   moving a second portion of the autoclave toward the first portion of the autoclave to position a second portion of the aircraft wing within the second portion of the autoclave;
   rotating a first longitudinal axis of the first portion of the autoclave by a first rotation angle and rotating a second longitudinal axis of the second portion in an opposite direction by a second rotation angle to change an autoclave angle between longitudinal axes of the first portion of the autoclave and the second portion of the autoclave to accommodate the dihedral angle of the aircraft wing, wherein rotating the first longitudinal axis of the first portion of the autoclave changes the autoclave angle to substantially match the dihedral angle of the aircraft wing, and wherein the autoclave angle is greater than zero;
   joining the first portion of the autoclave and the second portion of the autoclave; and
   applying pressure and heat to the aircraft wing.

2. The method of claim 1, further comprising orienting the aircraft wing prior to inserting the first portion of the aircraft wing into the first portion of the autoclave.

3. The method of claim 1, the second rotation angle is equal to a negative angle of the first rotation angle.

4. The method of claim 1, further comprising aligning the first portion of the autoclave along a radial track, wherein the radial track enables rotating the first longitudinal axis of the first portion of the autoclave.

5. The method of claim 1, wherein inserting the first portion of the aircraft wing includes moving a cart along a track inside the first portion of the autoclave, the cart supporting a jig, the jig including wheels that engage the track, the jig further supporting a tool configured to form the aircraft wing.

6. The method of claim 1, wherein joining the first portion of the autoclave and the second portion of the autoclave includes rotating the first portion of the autoclave, the second portion of the autoclave, or a combination thereof.

7. The method of claim 1, wherein the aircraft wing is a single piece aircraft wing.

8. The method of claim 1, wherein an inner contour of the autoclave is complementary to an exterior contour of the aircraft wing, and wherein the first portion of the autoclave and the second portion of the autoclave include sufficient spacing between the first portion of the autoclave and the second portion of the autoclave to accommodate airflow and tooling of the aircraft wing.

9. The method of claim 1, further comprising supporting a pivot point of the autoclave proximate to an offset joint defined between the first portion of the autoclave and the second portion of the autoclave, the pivot point enabling the change to the autoclave angle.

10. The method of claim 1, further comprising moving a jig in the first portion of the autoclave to support the aircraft wing while applying pressure and heat to the aircraft wing.

11. The method of claim 1, wherein the second portion of the autoclave is located opposite from the first portion of the autoclave.

12. The method of claim 1, wherein joining the first portion of the autoclave and the second portion of the autoclave includes aligning first cog teeth of the first portion of the autoclave in gaps defined by second cog teeth of the second portion of the autoclave, wherein the first cog teeth engage the second cog teeth to securely join the first portion of the autoclave and the second portion of the autoclave in response to a third rotation of the first cog teeth.

13. A method comprising:
   inserting a first portion of an aircraft wing into a first portion of an autoclave;
   moving a second portion of the autoclave toward the first portion of the autoclave to position a second portion of the aircraft wing within the second portion of the autoclave;
   rotating a first longitudinal axis of the first portion of the autoclave by a first rotation angle and rotating a second longitudinal axis of the second portion in an opposite direction by a second rotation angle to change an autoclave angle between longitudinal axes of the first portion of the autoclave and the second portion of the autoclave to accommodate a sweep angle of the aircraft wing, wherein rotating the first longitudinal axis of the first portion of the autoclave changes the autoclave angle to substantially match a dihedral angle of the aircraft wing, and wherein the autoclave angle is greater than zero;
   joining the first portion of the autoclave and the second portion of the autoclave; and
   applying pressure and heat to the aircraft wing.

14. The method of claim 13, further comprising orienting the aircraft wing prior to inserting the first portion of the aircraft wing into the first portion of the autoclave.

15. The method of claim 13, wherein the second rotation angle is equal to a negative angle of the first rotation angle.

16. The method of claim 13, further comprising aligning the first portion of the autoclave along a radial track.

17. A method comprising:
inserting a first portion of an aircraft wing into a first portion of an autoclave;
moving a second portion of the autoclave toward the first portion of the autoclave to position a second portion of the aircraft wing within the second portion of the autoclave;
rotating a first longitudinal axis of the first portion of the autoclave by a first rotation angle and rotating a second longitudinal axis of the second portion in an opposite direction by a second rotation angle to change an autoclave angle between longitudinal axes of the first portion of the autoclave and the second portion of the autoclave to accommodate the sweep angle of the aircraft wing, wherein rotating the first longitudinal axis of the first portion of the autoclave changes the autoclave angle to a dihedral angle of the aircraft wing, and wherein the autoclave angle is greater than zero;
supporting a pivot point of the autoclave proximate an offset joint defined between the first portion of the autoclave and the second portion of the autoclave, the pivot point enabling the change to the autoclave angle;
joining the first portion of the autoclave and the second portion of the autoclave; and
applying pressure and heat to the aircraft wing.

18. The method of claim 17, further comprising orienting the aircraft wing prior to inserting the first portion of the aircraft wing into the first portion of the autoclave.

19. The method of claim 13, wherein the second rotation angle is equal to a negative angle of the first rotation angle.

20. The method of claim 13, further comprising aligning the first portion of the autoclave along a radial track.

* * * * *